July 10, 1956

H. H. NAIDICH 2,754,507

VOLTAGE PROXIMITY INDICATOR

Filed Dec. 10, 1952

HERBERT H. NAIDICH
*INVENTOR.*

BY

*Killman, Kerst and Pfund*
ATTORNEYS

United States Patent Office 2,754,507
Patented July 10, 1956

2,754,507

VOLTAGE PROXIMITY INDICATOR

Herbert H. Naidich, Baltimore, Md., assignor to Bendix Aviation Corporation, Towson, Md., a corporation of Delaware Application December 10, 1952, Serial No. 325,110

5 Claims. (Cl. 343—11)

This invention relates generally to control circuits and more particularly to improved circuits for generating control signals in accordance with a predetermined proximity condition of voltages which are compared.

The invention finds particular application in radar systems of the type employed for guiding aircraft to a predetermined position with respect to a courseline utilizing radar observation of the relative position of the aircraft and radio transmitted commands for correcting the flight of the aircraft. Systems of this type, when used to guide an aircraft into a position adjacent a runway, are known as ground controlled approach (GCA) radar landing systems. One such system is described in U. S. Patent No. 2,483,644 to A. L. Kelsey et al. GCA systems generally provide separate antennas scanning in azimuth (AZ) and elevation (EL) with independent angular adjustment means for each antenna in the coordinate in which it is not scanning. Without intending to limit the generality of the invention, the description thereof will be with reference to a GCA system in which improved performance is achieved over that theretofore attainable as a result of features of the invention that will be apparent from the following detailed description.

An object of this invention is to provide an improved control signal in accordance with predetermined proximity conditions of two voltages which may vary over wide ranges.

Another object is to provide a gate voltage which is readily adjustable to any desired width in correspondence with predetermined proximity conditions of two voltages.

A further object is an improved arrangement for presenting data upon the screen of a visual indicator.

Still another object is to provide an improved GCA radar presentation with accurate, reliable and readily adjustable antenna beam position indicators.

These and other objects of the present invention will be apparent from the disclosed preferred embodiment which shows portions of a GCA radar system with improved circuits for producing a range mark "fan" representative of the elevational position of the azimuth antenna.

Figure 1:
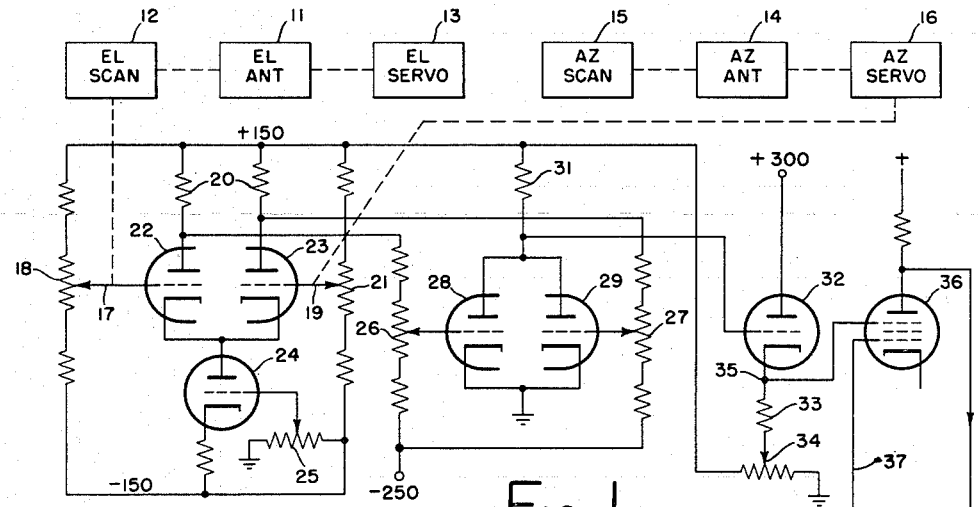
Fig. 1 is a schematic diagram of portions of an improved GCA radar in accordance with the present invention.

In Fig. 1 an elevation antenna 11 having a directive pattern is caused to scan through an angle of elevation by means of an elevation scanning means 12. The elevation antenna 11 is adjusted as to azimuth position over a limited range by the elevation servo mechanism 13. A similar arrangement is provided for an azimuth antenna 14, which is scanned in azimuth by an azimuth scanning means 15 and adjusted in elevation by an azimuth servo 16.

The operation of the foregoing antenna systems to scan and position radio wave beams in space is carried on in any well known manner. Depending upon the form of scanning and positioning used, other means are employed to derive electrical quantities representative of the instantaneous location of the energy beam. As represented in Fig. 1, this may be accomplished by mechanical means which are driven from the scanning mechanism 12 and the servo mechanism 16. An appropriate mechanical linkage to these elements will provide motion to a movable contact 17 to obtain a voltage from a potentiometer 18 which is representative of the scanning position of the elevation antenna 11. Similarly the elevational position of the azimuth antenna 15 through the servo 16 controls the position of a movable contact 19 on potentiometer 21. Voltages on the contacts 17 and 19 are applied to the grid input circuits of a pair of similar amplifiers 22, 23 which have equal plate load resistors 20 and a common cathode impedance comprising a constant current tube 24. The arrangement of tubes 22, 23 and 24 may conveniently be across a D. C. supply circuit having both positive and negative potentials. The tube 24 is supplied with an adjustable bias from a potentiometer 25. The tubes 22, 23 have their plates directly connected through adjustable voltage dividers 26, 27 to respective grids of a pair of tubes 28, 29. Any slight unbalance existing between the amplifiers 22, 23 can be compensated as to the tubes 28, 29 by adjustment of the taps on the voltage dividers 26, 27. The tubes 28, 29 have a common plate load 31 and, preferably, no common impedance in the cathode circuits thereof. The potential from the common plates of the tubes 28, 29 is directly connected to the grid circuit of a cathode follower 32 which has the cathode load 33 returned to a point of adjustable positive potential 34. The potential at cathode 35 is directly applied to control amplification in a range mark amplifier 36 which has range mark impulses supplied to control grid 37. The output of the range mark amplifier 36 is applied to a video mixing circuit 38 for suitable mixing and gating as required for display upon the cathode-ray indicator 39.

Figure 2:
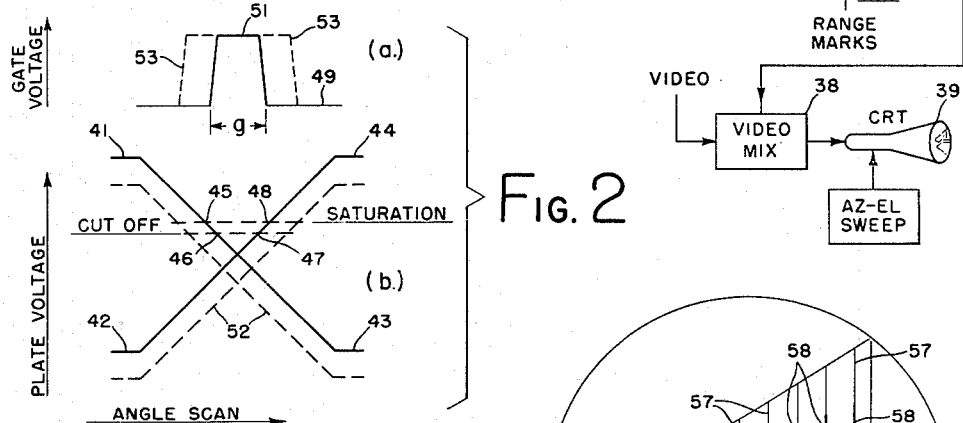
Fig. 2 is a waveform diagram showing the operation of the invention.

The operation of the proximity circuit disclosed in Fig. 1 will be described with reference to the voltage wave forms of Fig. 2. The voltage at the contact 17 will be varying in accordance with the scanning motion of the elevation antenna 11 over a predetermined range. Depending upon the setting of the contact 19 at some point in the motion of the contact 17 a region will be approached where the two voltages are within a predetermined value of each other. Assume, for example, that the tube 22 is cutoff and its plate potential is at 41. For this condition, due to the constant current characteristic of tube 24, the plate potential of tube 23 will be at some lower point 42. As the voltage on grid 17 becomes more positive, tube 22 begins to conduct and its plate potential eventually falls to the level 43. The corresponding rise in plate potential of the tube 23 is as shown due to the action of the constant current tube 24 and brings it to a level 44. During this transition the voltage applied to the grid of tube 28 passes through a saturation point 45 and a cutoff point 46. The grid of tube 29 passes through a corresponding cutoff point 47 and a saturation point 48. This action provides a region $g$ in Fig. 2($a$), of the angle scan voltage during which both tubes 28, 29 are at least partially cutoff. For this cutoff condition in both tubes 28 and 29 the potential of the common anodes of these tubes rises from its normal level 49 to a more positive level 51. The position of the region $g$, upon the whole range of angle scan voltage, is determined by the potential of the contact 19 and will vary in accordance with variations of the position of the contact 19 on the potentiometer 21. The width of the region g depends upon the sum of the currents flowing through tubes 22, 23, which is established by the constant current tube 24. Adjustment of the bias for tube 24 has the effect of changing the magnitude of the constant current in the tube 24 and of varying the width of the gate g as indicated by the dotted lines 52 in Fig. 2(b) and 53 in Fig. 2(a).

The change in level of the plates of tubes 28, 29 is applied to the cathode follower 32 which reproduces this change at the cathode 35 referenced to a suitable potential for application to the tube 36 as a gate control voltage. This gate control voltage preferably is effective to change the gain of the stage 36 between predetermined limits rather than to act as a complete on and off control of signal translation thereby. This action permits the range marks to be applied to the cathode-ray display with two different levels of intensity to define an area 58 representing the angular beam of the azimuth antenna.

Figure 3:
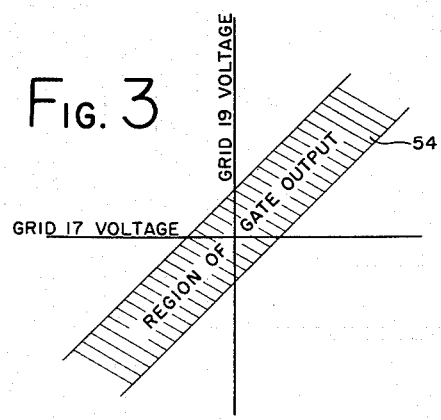
Fig. 3 is a voltage diagram representing a range of operation of the preferred embodiment; and, Fig. 4 shows the display on the screen of the cathode-ray tube of Fig. 1.
Figure 4:
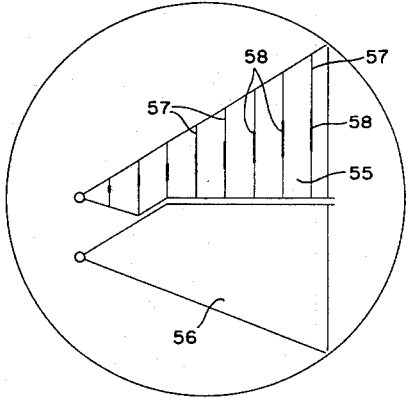

In Fig. 3 the range of operation available with the circuits of the present invention which will produce the gate g is represented by the shaded area 54 with respect to axes corresponding to the ranges of values of voltage on grids 17, 19. It will be obvious that the interval of values of the scanning voltage on contact 17 which produces the output gate g varies in accordance with the voltage on contact 19 but the interval remains constant irrespective of the values of these voltages, as indicated by the parallel boundaries of the region 54. This width is controlled by the bias adjustment 25 as hereinbefore described and can be made to coincide with the effective elevational beam width of the azimuth antenna. As this elevation is varied by the servo 16, the voltage on contact 19 will vary accordingly, and the interval of the elevation sweep voltage on contact 17 within the shaded area for that elevational adjustment will likewise vary. The duration of the gate g, therefore, corresponds to the angular location of the azimuth antenna in the elevation coordinate and may be applied to the cathode-ray tube 29 to modify the display accordingly. In Fig. 4 one such form of display is shown in which an elevation display 55 and an azimuth display 56 appear on the same cathode-ray tube screen as a function of range. One such display which is known in the art produces range marks 57 at predetermined intervals which are modified in intensity at the portions 58 during the interval of the gate g as hereinbefore explained.

An arrangement similar to the one described, operating from the azimuth scan mechanism 15 and elevation servo mechanism 59, can be employed to produce a similar range mark "fan" of the azimuth position of the elevation antenna on the azimuth display 56. With this arrangement the position of the intensified portions can be readily adjusted to correspond to the actual position of the elevation antenna beam in space and the width of the intensified portions can be adjusted to correspond to the effective width of the energy beam. Thereupon the scanning operation of the antennas traces out the cathode-ray displays 55, 56 with range marks for each sweep of the electron beam producing an intensified spot at predetermined intervals to form the lines 57. As the sweeping proceeds through the region 54 corresponding to the servo adjustment of each antenna in the coordinate in which it is not scanning, the occurrence of the gates g produce the intensified portions 58 on each display.

What is claimed is:

1. In a radar system comprising two antenna beams independently movable in one coordinate, a means associated with the said beams for generating voltages of magnitudes representative of the positions thereof, a cathode ray tube having associated with it a means for deflecting the electron beam thereof in synchronism with one of the said voltages, and a means for modulating the said electron beam such as to provide range marks on the face of the said tube; an indicator system comprising: a fourth means; said fourth means comprising two input circuits and one output circuit; means respectively connecting the first said means to the said input circuits; said fourth means responsive to differences in magnitudes of the voltages applied to the said input circuits such as to produce at the said output circuit a signal when the magnitude of the difference between the said voltages is less than a predetermined level; a summation means; said summation means comprising two input circuits and one output circuit; means joining one of the last named input circuits to the output circuit of the said marking means; means joining the remaining of the said input circuits to the said output circuit of the said fourth means; and means connecting the said output circuit of the said summation means to the said cathode ray tube.

2. In a radar system comprising two antenna beams independently movable in one coordinate, a means associated with the said beams for generating voltages of magnitudes representative of the positions thereof, a cathode ray tube having associated with it a means for deflecting the electron beam thereof in synchronism with one of the said voltages, and a means for modulating the said electron beam such as to provide range marks on the face of the said tube; an indicator system comprising: a differential amplifier; said differential amplifier containing two input circuits and two output circuits; said amplifier arranged such that the summations of the voltages present at the said output terminals are substantially equal when various combinations of voltages between predetermined magnitudes are inserted in the said input circuits; means individually connecting the first said means to the said input circuits; a fifth means; said fifth means comprising two input circuits and one output circuit; said fifth means responsive to differences in magnitudes of voltages applied to the said input circuits such as to produce at the said output circuit a signal when the magnitudes of the said differences are less than a predetermined value; means individually connecting the said input circuits of the said fifth means to the said output circuits of the said differential amplifier; a summation means; said summation means comprising two input circuits and one output circuit; means joining one of the last named input circuits to the output circuit of the said marking means; means joining the remaining of the said input circuits to the said output circuit of the said fifth means; and means connecting the said output circuit of the said summation means to the said cathode ray tube.

3. In a radar system comprising two antenna beams independently movable in one coordinate, a means associated with the said beams for generating voltages of magnitudes representative of the positions thereof, a cathode ray tube having associated with it a means for deflecting the electron beam thereof in synchronism with one of the said voltages, and a means for modulating the said electron beam such as to provide range marks on the face of the said tube; an indicator system comprising: a differential amplifier; said differential amplifier containing two input circuits and two output circuits; said amplifier arranged such that the summations of the voltages present at the said output terminals are substantially equal when various combinations of voltages between predetermined magnitudes are inserted in the said input circuits; means individually connecting the first said means to the said input circuits; two amplifiers; said amplifiers comprising individual input circuits and a common load impedance; means respectively joining the said output circuits of the said differential amplifier to the said input terminals of the said amplifiers; summation means; said summation means comprising two input circuits and an output circuit; means connecting the output circuit of the said marking means to one of the said input circuits of the said summation means; means connecting the said output circuit of the said amplifiers to the remaining circuit of the said input circuits of the said summation means; and means connecting the said output circuit of the said summation means to the said cathode ray tube.

4. In a radar system comprising two antenna beams independently movable in one coordinate, a means associated with the said beams for generating voltages of magnitudes representative of the positions thereof, a cathode ray tube having associated with it a means for deflecting the electron beam thereof in synchronism with one of the said voltages, and a means for modulating the said electron beam such as to provide range marks on the face of the said tube; an indicator system comprising: a differential amplifier; said differential amplifier containing two input circuits and two output circuits; said amplifier arranged such that the summations of the voltages present at the said output terminals are substantially equal when various combinations of voltages between predetermined magnitudes are inserted in the said input circuits; means individually connecting the first said means to the said input circuits; two amplifiers; said amplifiers comprising individual input circuits and a common load impedance; means respectively joining the said output circuits of the said differential amplifier to the said input terminals of the said amplifiers; said amplifiers so arranged that the individual tube transitions between tube cut off and tube saturation occur within a relatively small portion of the total variation of the said input voltages; summation means; said summation means comprising two input circuits and an output circuit; means connecting the said output circuit of the said marking means to one of the said input circuits of the said summation means; means connecting the said output circuit of the said amplifiers to the remaining circuit of the said input circuits of the said summation means; and means connecting the said output circuit of the said summation means to the said cathode ray tube.

5. In a radar system comprising two antenna beams independently movable in one coordinate, a means associated with the said beams for generating voltages of magnitudes representative of the positions thereof, a cathode ray tube having associated with it a means for deflecting the electron beam thereof in synchronism with one of the said voltages, and a means for modulating the said electron beam such as to provide range marks on the face of the said tube; an indicator system comprising: a differential amplifier; said differential amplifier containing two input circuits and two output circuits; said amplifier arranged such that the summations of the voltages present at the said output terminals are substantially equal when various combinations of voltages between predetermined magnitudes are inserted in the said input circuits; means individually connecting the first said means to the said input circuits; two amplifiers; said amplifiers comprising individual input circuits and a common load impedance; means respectively joining the said output circuits of the said differential amplifier to the said input circuits of the said amplifiers; said amplifiers so arranged that the individual tube transitions between tube cut off and tube saturation occur within a relatively small portion of the total variation of the said input voltages; a cathode follower; said cathode follower comprising an input circuit and an output circuit; means connecting the said output circuit of the said amplifiers to the said input circuit of the said cathode follower; summation means; said summation means comprising two input circuits and an output circuit; means connecting the output circuit of the said marking means to one of the said input circuits of the said summation means; means connecting the said output circuit of the said cathode follower to the remaining circuit of the said input circuits of the said summation means; and means connecting the said output circuit of the said summation means to the said cathode ray tube.

References Cited in the file of this patent

UNITED STATES PATENTS 2,483,644     Kelsey _____ Oct. 4, 1949.